US011919029B2

(12) United States Patent
Cauthen et al.

(10) Patent No.: US 11,919,029 B2
(45) Date of Patent: Mar. 5, 2024

(54) PRESSURIZED CONSTRUCTION ADHESIVE APPLICATOR SYSTEM

(71) Applicant: Illinois Tool Works Inc., Glenview, IL (US)

(72) Inventors: Glen Allen Cauthen, Irving, TX (US); Michael N. Atwater, Rockland, MA (US); Frederick P. Walnut, Irving, TX (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 16/478,053

(22) PCT Filed: Jan. 17, 2018

(86) PCT No.: PCT/US2018/014070

§ 371 (c)(1),
(2) Date: Jul. 15, 2019

(87) PCT Pub. No.: WO2018/136528

PCT Pub. Date: Jul. 26, 2018

(65) Prior Publication Data

US 2019/0366366 A1 Dec. 5, 2019

Related U.S. Application Data

(60) Provisional application No. 62/448,233, filed on Jan. 19, 2017.

(51) Int. Cl.
*B05B 9/08* (2006.01)
*B65D 83/20* (2006.01)

(52) U.S. Cl.
CPC .......... *B05B 9/0805* (2013.01); *B05B 9/0894* (2013.01); *B65D 83/207* (2013.01)

(58) Field of Classification Search
CPC ... B05B 9/0805; B05B 9/0894; B05B 1/3046; B65D 83/207; B65D 83/752; B65D 83/756
See application file for complete search history.

(56) References Cited

U.S. PATENT DOCUMENTS 2,880,940 A * 4/1959 Briggs .................. B05B 7/2437 239/415
3,312,585 A * 4/1967 Hamme .............. E04F 13/0889 428/126

(Continued)

FOREIGN PATENT DOCUMENTS

| | | | | |
|---|---|---|---|---|
| EP | 2078565 A1 * | 7/2009 | ........... | B05B 9/0894 |
| EP | 2803418 A1 | 11/2014 | | |
| WO | 2009/036062 A2 | 3/2009 | | |

OTHER PUBLICATIONS

International Search Report dated May 4, 2018 for International Application No. PCT/US2018/014070 filed Jan. 17, 2018.

*Primary Examiner* — Donnell A Long
(74) *Attorney, Agent, or Firm* — Renner, Kenner; Arthur M. Reginelli

(57) ABSTRACT

A pressurized construction adhesive applicator system is provided that is able to apply adhesive to vertical surfaces without foaming, solvents, or resort to mechanical pumps. The pressurized construction adhesive applicator system including a canister having a volume, a one- part curable construction adhesive in the volume a lid forming a seal with said canister, an applicator wand having a trigger in fluid communication with the one-part curable construction adhesive via a tube, and a pressurant in the volume in an amount sufficient to urge the one-part curable construction adhesive from the volume and out of a nozzle of the applicator as a bead with depression of the trigger.

18 Claims, 3 Drawing Sheets

(56) References Cited

U.S. PATENT DOCUMENTS

| | | | | | |
|---|---|---|---|---|---|
| 4,301,971 | A * | 11/1981 | Cornelius | B05B 7/2437 222/401 |
| 4,483,483 | A * | 11/1984 | Grime | B05B 7/2435 239/526 |
| 4,940,185 | A * | 7/1990 | Fu | B05B 7/241 239/126 |
| 4,989,787 | A * | 2/1991 | Nikkel | B05B 7/0087 239/346 |
| 5,054,687 | A * | 10/1991 | Burns | B05B 7/24 239/373 |
| 5,251,822 | A * | 10/1993 | Wang | B05B 7/2437 239/346 |
| 5,318,207 | A * | 6/1994 | Porter | B05B 9/04 222/387 |
| 5,526,957 | A * | 6/1996 | Brown | B29B 7/7404 222/96 |
| 5,701,708 | A * | 12/1997 | Taraba | E04B 1/14 52/210 |
| 5,887,756 | A | 3/1999 | Brown | |
| RE36,378 | E * | 11/1999 | Mellette | B05B 7/0838 239/8 |
| 6,588,159 | B1 * | 7/2003 | Cotton, Jr. | E06B 1/08 49/504 |
| 8,132,693 | B2 * | 3/2012 | Choiniere | B05C 11/1036 222/135 |
| 2002/0037364 | A1 * | 3/2002 | Fleming | G02B 5/128 427/162 |
| 2002/0170250 | A1 * | 11/2002 | Chambers | E04C 3/02 52/270 |
| 2004/0024077 | A1 * | 2/2004 | Braun | C08G 18/4018 521/155 |
| 2004/0035881 | A1 * | 2/2004 | Hammarth | B05B 9/01 222/105 |
| 2004/0050962 | A1 | 3/2004 | Hammarth et al. | |
| 2004/0147663 | A1 * | 7/2004 | Silvers | C09J 133/06 524/501 |
| 2005/0218157 | A1 * | 10/2005 | McMahon | B05B 9/0888 222/175 |
| 2007/0194052 | A1 * | 8/2007 | McMahon | B05B 9/0888 222/175 |
| 2009/0065121 | A1 | 3/2009 | Silvers et al. | |
| 2009/0308946 | A1 | 12/2009 | Dube et al. | |
| 2011/0296777 | A1 * | 12/2011 | Matta | E06B 1/342 52/208 |
| 2014/0339320 | A1 * | 11/2014 | Gantenbein | G01K 11/165 239/1 |
| 2015/0231655 | A1 * | 8/2015 | Adams | B05B 12/002 427/421.1 |
| 2015/0259459 | A1 * | 9/2015 | Zhang | C08G 18/1825 521/115 |
| 2016/0199862 | A1 * | 7/2016 | Poppe | B65D 83/207 239/375 |
| 2016/0296780 | A1 * | 10/2016 | Singh | A62D 1/0092 |
| 2016/0325294 | A1 * | 11/2016 | MacIndoe | F16K 1/14 |
| 2017/0043362 | A1 * | 2/2017 | Collins | B29B 7/761 |
| 2017/0297049 | A1 * | 10/2017 | Buck | B05C 17/00553 |
| 2018/0104705 | A1 * | 4/2018 | Slutskii | B65D 83/752 |
| 2018/0221897 | A1 * | 8/2018 | Collins | B05B 7/32 |
| 2019/0169354 | A1 * | 6/2019 | Kelch | C09J 175/14 |

* cited by examiner

PRESSURIZED CONSTRUCTION ADHESIVE APPLICATOR SYSTEM

RELATED APPLICATIONS

This application claims priority benefit of U.S. Provisional Application Ser. No. 62/448,233 filed Jan. 19, 2017; the contents of which are hereby incorporated by reference.

FIELD OF THE INVENTION

The present invention in general relates to construction adhesive and in particular to a construction adhesive that can be applied to vertical surfaces without foaming, solvents, or resort to mechanical pumps.

BACKGROUND OF THE INVENTION

Traditionally, the manufactured housing (MH) and recreational vehicle (RV) industries pay their labor force by the number of assemblies ("pieces") that they produce each shift, not by an hourly wage. Speed is critical in the assembly areas. Workers literally run between tasks to finish as soon as they can. Workers may leave after they complete their assigned units, no matter how little, or how much, time it takes on that shift.

Adhesives are typically used during the manufacturing process of MH and RVs to join various components and structural elements and assemblies. Examples of use of adhesives in the manufacturing process of manufactured housing and recreational vehicles illustratively include the following: Interior partition walls in MH production with a 0.15 cm (1/16") to 0.31 cm (1/8") adhesive bead (Fomo Handi-Stick Subfloor adhesive and OSI SF450 subfloor adhesive (or OSI F38 Drywall adhesive)) applied on studs and headers, and gypsum wallboard applied over the studs, and then mechanically fastened; Floor decking in MH production with a 0.15 cm (1/16") to 0.31 cm (1/8") adhesive bead (Fomo Handi-Stick Subfloor adhesive and OSI SF450 subfloor adhesive (or OSI F38 Drywall adhesive)) applied on joists, and plywood applied over the joists, and then mechanically fastened; Structural walls (shear walls) in MH production with application of two parallel 1/16" to 1/8" wide beads of 1-part moisture cured polyurethane (PU adhesive applied along the surface of the top plate, bottom plate and all framing studs (i.e., two beads on all 1½" thick framing members and one bead on all ¾" framing members; Side walls in MH production by applying two parallel 0.15 cm (1/16") to 0.31 cm (1/8") wide beads of adhesive (1-part moisture cured PU) along the surface of the top plate, bottom plate and all framing studs (i.e., two beads on all 3.8 cm (1½") thick framing members and one bead on all 1.9 cm (¾") framing members); and Interior wall and ceiling panel construction in Recreational Vehicle production where a 0.15 cm (1/16") bead of adhesive (white wood glue and polyurethane) is applied on studs, headers, and floor plates in the in the field of the panel, and not on the joints.

The previously mentioned adhesives generally contain solvents, such as acetone, methyl acetate, etc., and are flammable products. In addition, the adhesives are typically applied with a manual caulking gun 10 as shown in FIGS. 1A and 1B with an adhesive tube 12 inserted in the caulking gun 10 in FIG. 1B. Manual operated caulking guns can cause fatigue and discomfort in the wrist and elbow of users due to the repetitive squeezing of the manual gun to apply the mastic adhesive. Mastic adhesives typically have a viscosity of greater than 200,000 centipoise, and requires greater pressure to be applied to dispense the adhesive. Repetitive grip force to extrude these mastics typically exceed 20 pounds. This repetitive overuse can cause an inflammation of the tendons that join the forearm muscles on the outside of the elbow ("Tennis Elbow"). The forearm muscles and tendons become damaged from overuse by repeating the same motions again and again. This leads to pain and tenderness on the outside of the elbow. Furthermore, inconsistent placement and amount of the bead of mastic adhesive due to manual operated caulking guns is common.

It is further noted that aerosol spray foam adhesives as shown in FIG. 2 contain a blowing agent, usually 1,1,1,2-tetrafluoroethane (HFC-134a). HFC-134a is a greenhouse gas that has a high global warming potential which contributes to climate change.

Thus, there exists a need for a mastic that can be applied from a pressurized canister without resort to foaming of the adhesive, mechanical pumps, or solvents. There further exists a need to provide for pressurized canister applicator capable of applying a uniform bead of mastic to both vertical and horizontal substrates that limits repetitive stress on a worker.

SUMMARY OF THE INVENTION

A pressurized construction adhesive applicator system includes a canister having a volume with a one-part curable construction adhesive in the volume. A lid forms a seal with the canister. An applicator wand having a trigger is in fluid communication with the one-part curable construction adhesive via a tube. A pressurant in the volume in an amount sufficient to urge the one-part curable construction adhesive from the volume and out of the applicator as a bead with depression of a trigger.

A process of making an applicator system includes adding to a metal canister with between 4.2 and 4.6 liters of a one-part construction adhesive substantially devoid of VOC solvent and blowing agent, sealing the canister with a lid, and pressurizing the canister with a pressurant via a gas fitting, the gas fitting adapted to couple to a tube terminating in a distal applicator having a trigger.

A process of using the pressurized construction adhesive applicator system includes adjusting a nozzle to control bead size of dispensed adhesive, aligning the nozzle to a surface to be joined to, and depressing a trigger to dispense the adhesive while moving the nozzle to form a bead line.

BRIEF DESCRIPTION OF THE DRAWINGS

The present invention is further detailed with respect to the following drawings. These figures are not intended to limit the scope of the present invention but rather illustrate certain attributes thereof.

DETAILED DESCRIPTION OF THE INVENTION

Figure 1A:
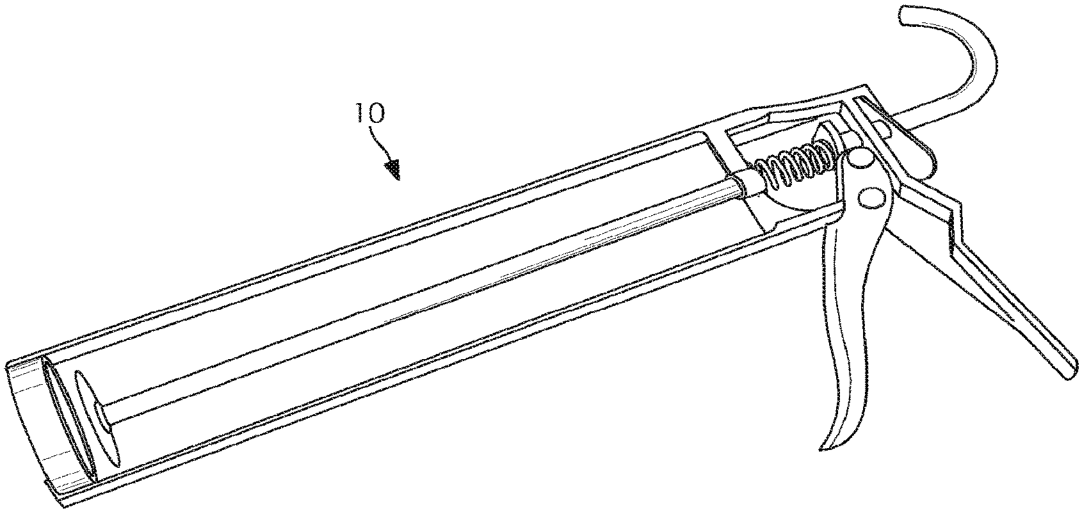
FIG. 1A (PRIOR ART)
FIG. 1A is a perspective view of a prior art caulking gun.
Figure 1B:
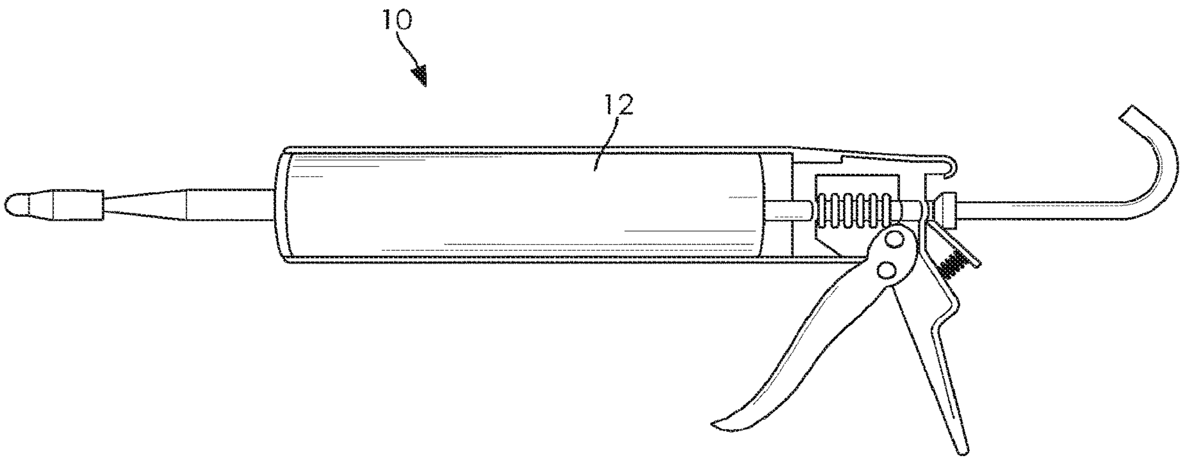
FIG. 1B (PRIOR ART)
FIG. 1B is a side view of the caulking gun of FIG. 1A with an adhesive cartridge inserted.
Figure 2:
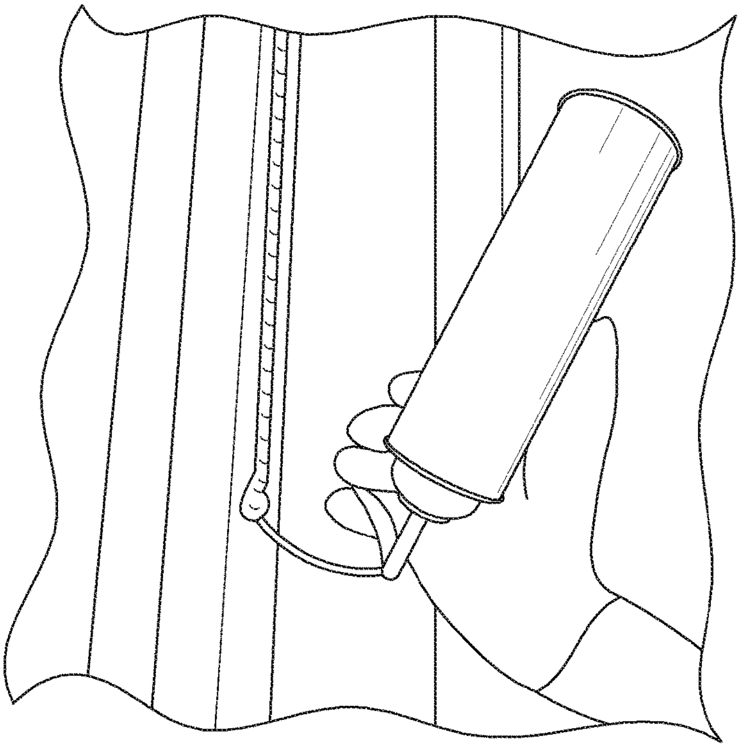
FIG. 2 (PRIOR ART)
FIG. 2 is a photograph showing an application of a spray foam adhesive with an existing aerosol can applicator.

The present invention has utility as to provide an adhesive used to bond two substrates together. In a specific application an inventive adhesive is used to primarily bond wallboard to stud and header framing assemblies. There is a moderate amount of force applied to the assembly after the substrates are mated. The wallboard is then mechanically fastened to the studs, or header. The adhesive may also be used to bond flooring to joists, and other structural wood applications within the manufactured home, and interior wall and ceiling panel construction in recreational vehicles. The present invention is advantageous in replacing canned foam and mastic drywall stud adhesive, as well as manual caulk guns.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In a specific embodiment of the present invention a structural moisture-cured polyurethane adhesive is provided in a pressurized container that is formulated to meet the structural requirements of wall and floor construction for the manufactured housing and recreational vehicle industry, and is designed to bond flooring to joists, wallboard to stud and header framing, as well as other structural applications.

Embodiments of the inventive adhesive and adhesive applicator offer several advantages over currently available adhesives and adhesive applicators. Embodiments of the pressurized container of structural adhesive allow for adhesive application on horizontal and vertical surfaces without any outside pumps or motors. The pressurized container is portable and may be moved around the structure and/or manufacturing plant. The pressurized container has a hose and applicator gun attached to it, where a trigger on the gun is depressed to dispense the adhesive. The adhesive flows consistently from the pressurized container, and the gun is adjustable to regulate bead size for consistent placement of a bead of adhesive, which is an improvement over manual operated caulking guns that typically provide inconsistent placement and amount of the bead of mastic adhesive due to manual operation and applied pressure with caulking guns. The pressurized container and application gun, by providing consistent placement of a bead of adhesive, ensures correct application and better quality of the assembly. Unlike existing aerosol spray foam adhesives that contain a blowing agent for foaming, usually 1,1,1,2-tetrafluoroethane (HFC-134a which is a greenhouse gas, the pressurized container does not have any blowing agents and the adhesive is extruded as a bead. Embodiments of the inventive adhesive do not contain solvents unlike many existing mastic adhesives that contain solvents, such as acetone, methyl acetate, etc., which are flammable products. The pressurized container is solvent free and contains no flammable components. Furthermore, the size of the pressurized container allows for efficiencies gained by not having to stock, open, and use multiple cartridges or containers of adhesive. In a specific embodiment, an 11-pound pressurized container size contains the equivalent of 97 cartridges of 28-ounce mastic adhesive. The pressurized container may be constructed out of recyclable steel, while the empty mastic packaging is typically disposed of in the trash.

Embodiments of the inventive adhesive are solvent free with less than 10 g/L of volatile organic compounds (VOC) and are Green DOT diamond certified. The adhesive passes standards tests including: ASTM C557, AFG-01, ASTM D3498, ASTM D6464, ASTM E72, and CA25-4. The adhesive is suitable for horizontal and vertical applications and has fast and aggressive tack. The adhesive has a 15-minute open time and a 4-hour Clamp Time. Embodiments of the adhesive are freeze-thaw stable with a shelf life of at least one year Embodiments of the inventive adhesive may illustratively be used in these non-limiting example assemblies: Interior partition walls in MH production where a 0.15 cm (1/16") to 0.31 cm (1/8") bead of the adhesive is applied on studs and headers with gypsum wallboard applied over the studs, then mechanically fastened; Floor decking in MH production where a 0.15 cm (1/16") to 0.31 cm (1/8") bead is applied on joists with plywood is applied over the joists, and then mechanically fastened; Structural Walls (Shear Walls) in MH production where two parallel 0.15 cm (1/16") to 0.31 cm (1/8") wide beads are applied along the surface of the top plate, bottom plate and all framing studs (i.e., two beads on all 1½" thick framing members and one bead on all ¾" framing members); Side walls in MH production where two parallel 0.15 cm (1/16") to 0.31 cm (1/8") wide beads along the surface of the top plate, bottom plate and all framing studs (i.e., two beads on all 3.8 cm (1½") thick framing members and one bead on all 1.9 cm (¾") framing members); and Interior wall and ceiling panel construction in recreational vehicle production where a 0.15 cm (1/16") bead is applied on studs, headers, and floor plates in the in the field of the panel, not on the joints.

Figure 3:
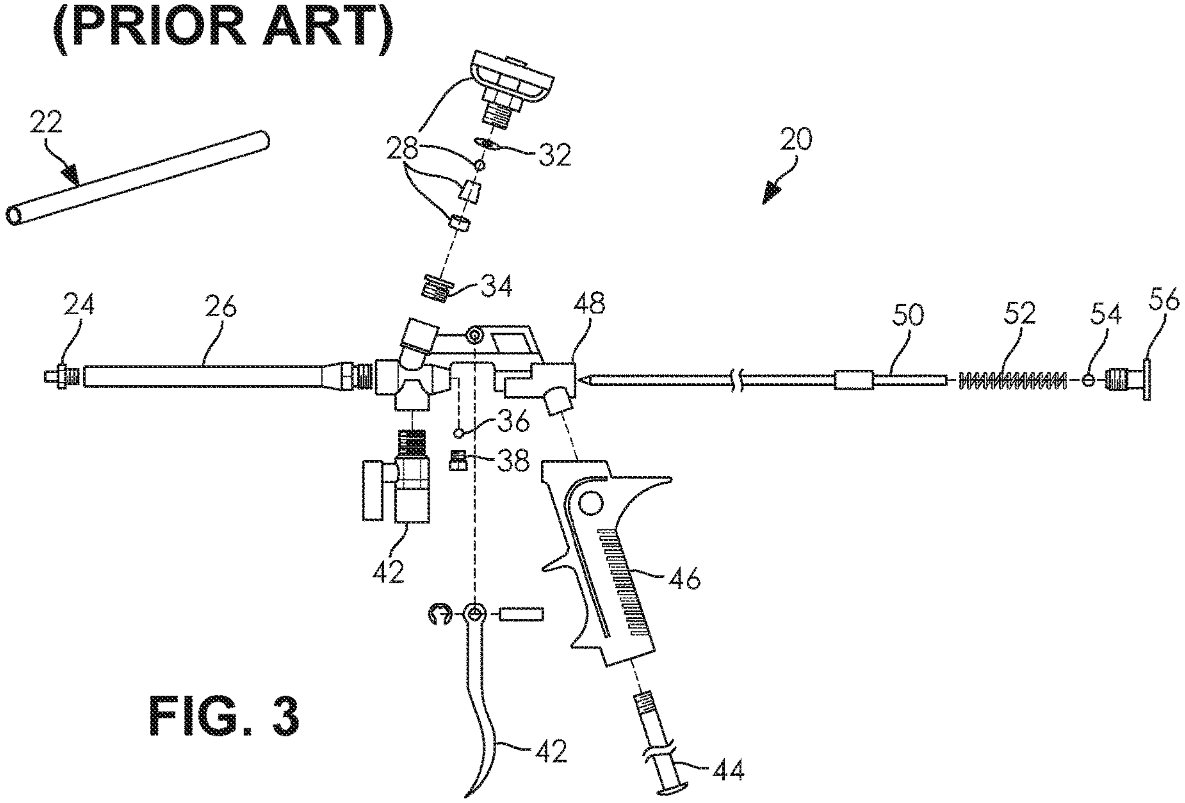
FIG. 3 is an exploded drawing of a foam gun applicator in accordance with an embodiment of the invention.
Figure 4:
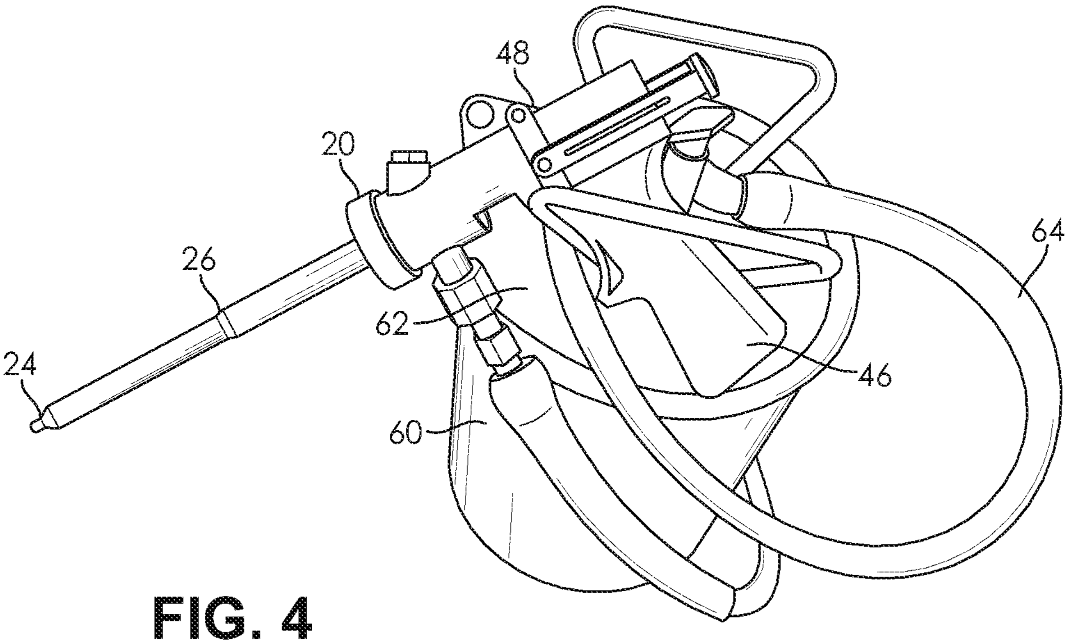
FIG. 4 is a perspective view of a pressurized canister connected to the foam gun of FIG. 3 in accordance with embodiments of the invention.

Referring now to the figures, FIG. 3 is an exploded drawing of a foam gun applicator 20. The major components of the foam gun applicator 20 include a body 48 that engages a barrel 26. While the joinder therebetween is depicted as threads mating to a complementary threaded hole in the body 48, it is appreciated that other fitting schemes are common to the art. A needle 50 engages the body 48 and extends into an aperture in the barrel 26. The barrel 26 terminating in an optional nozzle 24. In some embodiments for the present invention, an extension 22 is provided to project product into small or more remote areas. A product flow knob 56 is mechanically coupled to the needle 50 to meter product from flow from the barrel 26. The knob 56 is coupled to the needle 50 via the interaction of a needle spring 52 and a ball bearing 54. A basket 28 is also mechanically coupled to the body 48 with a washer 32 and a plug intermediate therebetween. A ball valve 400 interconnects the body 48 with a product container via tubing as shown in FIG. 4. A trigger 42 is provided that upon depression brings adhesive product from coupled container into the body 48 for ejection from the barrel 26 at a rate dictated by the knob 56. A needle packaging retained with a needle packing screw 38 being engaged by trigger depression. A handle 46 is coupled to the body 48 with a support rod 44.

FIG. 4 is a perspective view of a pressurized canister 60 connected to the foam gun 20 of FIG. 3. The pressurized canister 60 has a volume for holding an adhesive illustratively including the inventive one-part curable construction adhesive that illustratively includes a moisture curing polyurethane that is substantially free of volatile organic compounds (VOC) solvent. The canister 60 may be made of steel with a volume between 1 and 10 liters. A lid 64 forms a pressurized seal with the canister 60. Foam gun 20 acts as an applicator wand having a trigger 42 in fluid communication with the one-part curable construction adhesive via a tube or hose 64. A pressurant illustratively including nitrogen or air is in the volume of the canister 60 in an amount sufficient to urge said one-part curable construction adhesive from the volume of the canister 60 and out of the applicator 20 as a bead with depression of the trigger 42. The size of the bead is determined by adjusting the nozzle 24. The use of a pressurant allows the adhesive to be substantially free of a blowing agent. The pressurant may be preloaded in the volume and no mechanical pump is in fluid communication with the one-part construction adhesive.

As used herein, polymer molecular weight is average molecular weight, unless otherwise specified.

An adhesive operative herein includes a di- or polyisocyanate reacted with a polyol. Such di- and polyisocyanates operative herein include methylene diphenyl diisocyanate (MDI), and toluene diisocyanate (TDI). The polyol reactive with the di- or polyisocyanate illustratively includes castor oil, polyphenol esters, polyether and polyester polyols. Still other adhesive operative herein are based on soybean protein isolate (SPI), and soybean flour (SF), lignin-based wood adhesives, and combinations thereof. The adhesive forms the largest single constituent of an inventive adhesive and in some embodiments is present from 84-99 total weight percent of the formulation.

A pigment or dye operative in the present invention illustratively includes titanium dioxide particulate, carbon black, iron oxides, phthalocyanine blue, azo dyes, anthraquinone dyes, manganese, and combinations thereof. These pigments and dyes are amenable to dissolution or suspension in the solvated linear aromatic resin. A pigment or dye is present from 0 to 1 total weight percent of a complete formulation for application to a substrate. It is appreciated that while a dye can be operative in amounts as lows as 0.05 total weight percent, particulate pigments require larger quantities to affect coloring. In specific inventive embodiments, a reactive dye is present that reacts with the polyurethane prepolymer.

Fillers operative in the present invention illustratively include saw dust, wheat straw, peanut shells, talc, mica, alumina trihydrate, calcium sulfate, calcium carbonate, magnesium sulfate, magnesium carbonate, barium sulfate, microspheres and the like. A filler is present from 0 to 40 percent of a complete formulation for application to a substrate.

A curative is provided in some inventive embodiments to regulate the curing speed of the formulation. A curative operative in the present invention illustratively includes an amine based catalyst, such as morpholine, N-methylmorpholine (NMM) and N-ethylmorpholine (NEM) and more recently dimethylaminoethylmorpholine (DMEM). A curative is present from 0 to 2 percent of a complete formulation for application to a substrate.

A defoamer is provided in some inventive embodiments to regulate the amount of gas entrapped in the adhesive. A defoamer operative in the present invention illustratively includes polydimethylsiloxanes that are of relatively low molecular weight of about 12,500-60,000 Centistokes. A defoamer is present from 0 to 2 percent of a complete formulation for application to a substrate.

A diluent is provided in some inventive embodiments to reduce pre-cured adhesive viscosity. A diluent operative in the present invention illustratively includes methyl soyate, chlorinated paraffins, and combinations thereof. A diluent is present from 0 to 20 percent of a complete formulation for application to a substrate.

Figure 5:
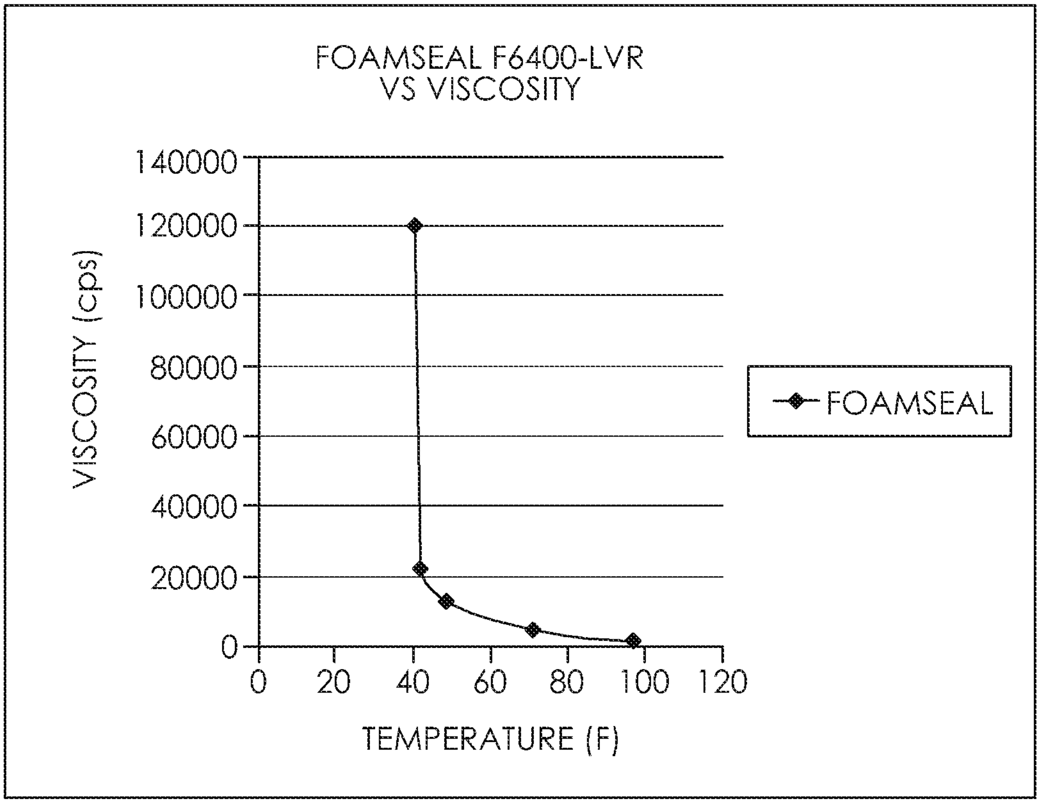
FIG. 5 is a graph of viscosity versus temperature for an embodiment of the adhesive.

In some inventive formulations particularly well suited for use as a mastic, the formulation is adjusted to not only have storage stability of at least 1 month and in some instances more than 3 months without appreciable separation, but also to have a viscosity in the range of 2000-5000 centipoise at 25° C. FIG. 5 is a graph of viscosity versus temperature for an embodiment of the adhesive. Below 40° F. there is a steep rise in viscosity, which is well below the recommended use temperature of 60° F. The adhesive turns to a solid at 0° F., but thaws uniformly once returned to room temperature. An inventive formulation is summarized in the following Table 1.

TABLE 1

Inventive mastic formulation in typical and specific versions A and B, with amount as total weight percent.

| Ingredient | Typical Amount (%) | Specific Amount A (%) | Specific Amount B (%) |
|---|---|---|---|
| Adhesive (e.g. isocyante/polyol) | remainder | 84-99 | 84-99 |
| Polymeric MDI (30-32% Isocyanate) | 48-74 | 55-74 | 48-59 |
| Castor Oil - Dry Grade | 0-24 | 14-24 | 0 |
| Polyether polyol | 0-40 | 0 | 30-40 |
| Defoamer (PDMS) | 0-2 | 0-1.3 | 0-1.3 |
| Dye | 0-1 | 0-0.04 | 0-0.04 |
| Curative | 0-2 | 0-1.3 | 0-1.3 |
| Diluent | 0-20 | 1-13 | 1-13 |

The present invention is further illustrated with respect to the following non-limiting examples. These examples are not intended to be construed as to limit the scope of the appended claims.

EXAMPLES

Example 1

The inventive adhesive formulation will thicken excessively below 40° F. and will be more fluid at higher temperatures. The pressurized canister needs to function and be able to dispense a bead at normal as well as extreme temperatures found in factory settings for Manufactured Housing and RV construction.

Test Results:

Conditions: Lab RT •Temperature 72° F. •Humidity 50% RH

Conditions for Canister Testing

Pressurized canister, gun and hose were conditioned at target temperature for 16-24 hours before dispensing and beads are extruded onto a vertical wood 5.1 ×10.2 cm (2"×4"). Beads are dispensed for widths of approximately 0.15 cm (1/16") to 0.31 cm (1/8"). Larger beads are evaluated to observe running Table 2 summarizes test observations.

TABLE 2

Test results for canister dispensing.

| Temperature (° F.) | Bead (0.15 cm) | Bead (0.31 cm) | Other |
|---|---|---|---|
| 40 | Extrudes | Extrudes | Runs <1-inch |
| 50 | Extrudes | Extrudes | Runs <1-inch |
| RT (70) | Extrudes | Extrudes | Runs <1-inch; 1/2-1 inch for larger bead 3/16 inch |
| 100 | Extrudes | Extrudes | Runs <1-inch; 1/2-1 inch for larger bead 3/16 inch |
| 100 (tested without spring loaded ball-check) | Extrudes | Extrudes | Runs <1-inch; 1/2-1 inch for larger bead 3/16 inch |

Results indicated that adhesive was applied with good control at the temperature extremes of 50° F. and 100° F. The recommended storage and application temperatures of the adhesive are within this range.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A pressurized construction adhesive applicator system comprising:

a canister having a volume;

a one-part moisture curable construction adhesive in the volume;

a lid forming a seal with said canister;

an applicator wand having a body having a single input located on a bottom side of the body and an output, the body being in fluid communication with said one-part moisture curable construction adhesive via a single tube that is connected to the body via a ball valve at the single input, the ball valve actuated between a closed position to an open position by a manually operated ball valve handle, the applicator wand additionally having a trigger that upon depression brings said one-part moisture curable construction adhesive from the canister into the body through the ball valve at the single input when the ball valve is in the open position for ejection from the output, the trigger being positioned on the bottom side of the body behind the single input; and a pressurant in the volume in an amount sufficient to urge said one-part moisture curable construction adhesive from the volume through a barrel and out of a nozzle of said applicator, a product flow knob mechanically coupled to a needle via the interaction of a needle spring and a ball bearing to meter said one-part moisture curable construction adhesive from said nozzle as an extruded bead with depression of said trigger;

wherein the one-part moisture curable construction adhesive can be applied to vertical surfaces without foaming, solvents, or resort to mechanical pumps.

2. The system of claim 1 wherein said canister is formed of steel.

3. The system of claim 1 wherein the volume is between 1 and 10 liters.

4. The system of claim 1 wherein said one-part construction adhesive is a moisture curing polyurethane.

5. The system of claim 1 wherein said one-part construction adhesive is substantially free of volatile organic compounds (VOC) solvent.

6. The system of claim 1 wherein said one-part construction adhesive is substantially free of a blowing agent.

7. The system of claim 1 wherein said one-part construction adhesive is substantially free of both VOC solvent and a blowing agent.

8. The system of claim 1 wherein said pressurant is nitrogen.

9. The system of claim 1 wherein said pressurant is preloaded in the volume and no mechanical pump is in fluid communication with said one-part construction adhesive.

10. The system of claim 1 wherein said one-part construction adhesive has a viscosity of 2,000 to 5,000 centipoise for said one-part construction adhesive.

11. The system of claim 1 wherein said one-part construction adhesive further comprises at least one additive of: a filler, a curative, a defoamer, and a dye, and a diluent to reduce viscosity.

12. The system of claim 11 wherein said dye is reactive.

13. The system of claim 1 wherein said canister further comprises at least one barrier between said one-part construction adhesive and said pressurant of: a bag containing said one-part construction adhesive, a diaphragm, or a plenum.

14. A process of making an applicator system of claim 1 comprising:

adding to a metal canister with between 4.2 and 4.6 liters of a one-part construction adhesive substantially devoid of VOC solvent and blowing agent;

sealing said canister with a lid;

pressurizing said canister with a pressurant via a gas fitting, said gas fitting adapted to couple to a tube terminating in a distal applicator having a trigger.

15. The process of claim 14 further comprising coupling said tube to said gas fitting.

16. A process of using the pressurized construction adhesive applicator system of claim 1 comprising:

adjusting the nozzle to control bead size of dispensed adhesive;

aligning the nozzle to a surface to be joined to;

depressing said trigger to dispense the adhesive; and moving the nozzle to form a bead line.

17. The process of claim 16 further comprising making interior partition walls in manufactured home production by applying a 0.15 cm to 0.31 cm bead of the adhesive on a set of studs and headers with a gypsum wallboard applied over the studs, and then mechanically fastening the gypsum wallboard.

18. The process of claim 16 further comprising decoupling the applicator wand from the canister and recycling the canister.

* * * * *